United States Patent [19]

Williamson et al.

[11] Patent Number: 4,832,813
[45] Date of Patent: May 23, 1989

[54] PULSED COUNTERFLOW EXTRACTION COLUMN

[75] Inventors: Edward J. Williamson, Egremont; David Garrett, Cleator; Francis Goodridge, Ponteland; Raymond E. Plimley, Jesmond, all of United Kingdom

[73] Assignee: British Nuclear Fuels plc, Cheshire, England

[21] Appl. No.: 130,220

[22] Filed: Dec. 8, 1987

[30] Foreign Application Priority Data

Dec. 11, 1986 [GB] United Kingdom ............... 8629681

[51] Int. Cl.⁴ .................. C25B 9/00; C25B 11/10
[52] U.S. Cl. ................................ 204/272; 204/273; 204/290 F; 204/292
[58] Field of Search ............... 204/222, 242, 272, 273, 204/284, 292, 290 R, 291, 290 F

[56] References Cited

U.S. PATENT DOCUMENTS

| | | | |
|---|---|---|---|
| 3,061,537 | 10/1962 | Yagishita | 204/275 |
| 3,728,245 | 4/1973 | Preis et al. | 204/275 |
| 3,770,612 | 11/1973 | Gray et al. | 204/273 |
| 3,869,374 | 3/1975 | Goldacker et al. | 204/273 |
| 4,101,408 | 7/1978 | Schmieder et al. | 204/272 |
| 4,212,723 | 7/1980 | Schmieder et al. | 204/272 |

Primary Examiner—Donald R. Valentine
Attorney, Agent, or Firm—Larson and Taylor

[57] ABSTRACT

Apparatus, which can be a pulsed column, which functions as an efficient electrolytic cell having an efficient liquid-liquid extraction capability. The apparatus can comprise an anode/cathode assembly having a geometry such as to produce a substantially uniform current distribution across the cell.

6 Claims, 3 Drawing Sheets

PULSED COUNTERFLOW EXTRACTION COLUMN

The present invention concerns apparatus for electrolytic reaction.

BACKGROUND OF THE INVENTION

The invention seeks to provide an apparatus, which can be a pulsed column, which functions as an efficient electrolytic cell having an efficient liquid-liquid extraction capability.

FEATURES AND ASPECTS OF THE INVENTION

According to the present invention apparatus for electrolytic reaction comprises an anode, a cathode and a means for dispersing an organic phase within a continuous ionically conducting phase, the anode and the cathode being arranged to produce a substantially uniform current distribution.

The invention will be described further, by way of example, with reference to the accompanying drawings, in which:

DESCRIPTION OF THE PREFERRED EMBODIMENTS

Figure 1:
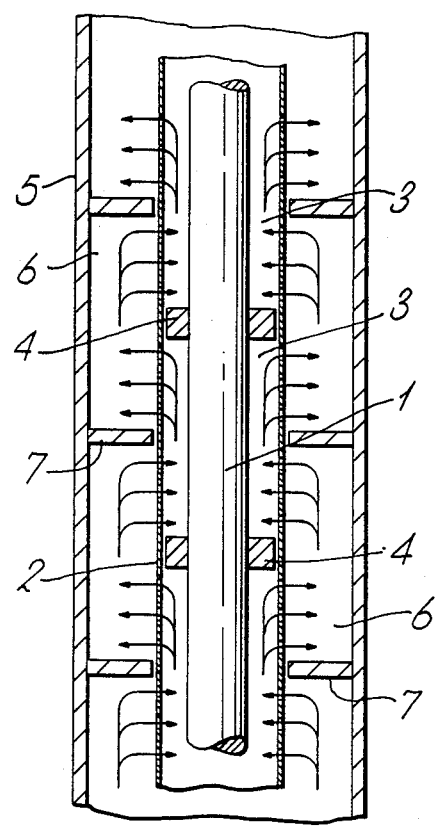
FIG. 1 is a schematic sectional elevation of a portion of an embodiment of an apparatus for electrolytic reaction.

An apparatus for electrolytic reaction as shown in FIG. 1 comprises a pulsed column having an elongate cylindrical anode 1 surrounded by a coaxial perforated tubular cathode 2. The annular chamber formed about the anode by the cathode is divided into a number of substantially equal annular compartments 3 by means of plates or collars 4 mounted on the anode 1. The anode/cathode assembly is positioned centrally within a housing 5 which constitutes the wall of the pulsed column. The annular chamber about the cathode and formed by the housing 5 is divided into a number of compartments 6 by baffle plates 7.

The baffle plates 7 are staggered with respect to the plates 4 and are spaced apart axially by a distance substantially equal to the spacing between the plates 4 mounted on the anode 1. Further, the baffle plates 7 are each preferably located substantially mid-way between adjacent plates 4.

In operation, the pulsed motion of the phases in the column is guided by the plates 4 and 7 to flow through the perforated cathode 2 as indicated by the arrows. It will be appreciated that the flow direction is reversible. The arrangement is such as to provide a uniform current distribution.

Figure 2:
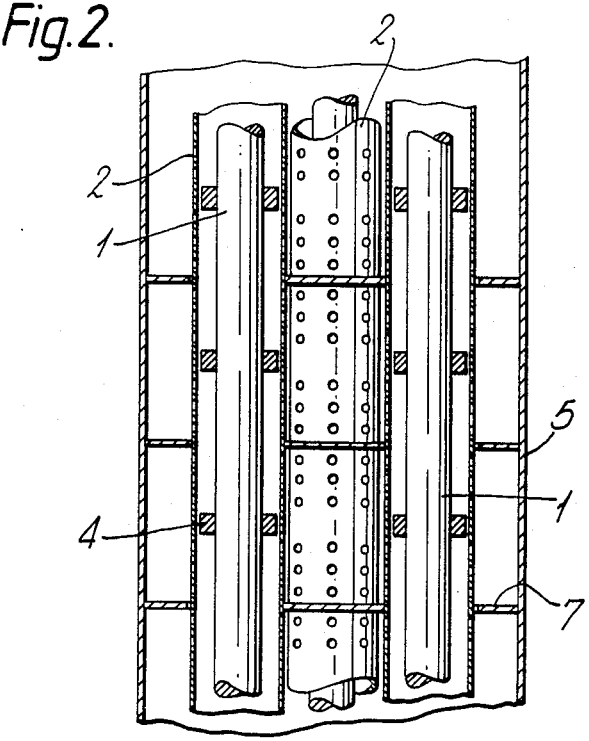
FIG. 2 is a schematic sectional elevation of a portion of an alternative embodiment on the line A—A in FIG. 3.
Figure 3:
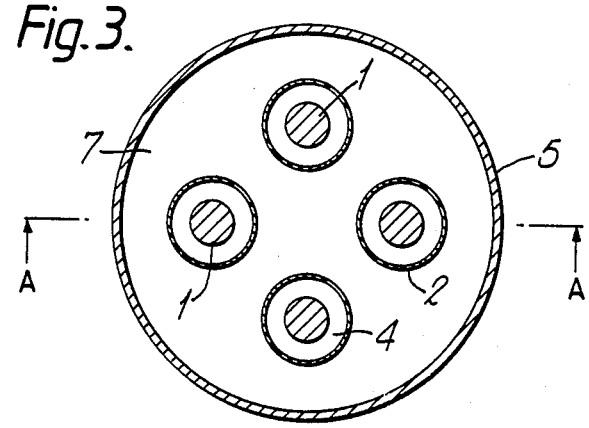
FIG. 3 is a plan of FIG. 2.

In practice it is possible to arrange a plurality of anode/cathode arrangements within a common housing. Such an assembly is shown in FIGS. 2 and 3, the reference numbers corresponding to those in FIG. 1.

The anode material can be titanium sub-oxide with the cathode being titanium metal. The plates 4 and 7 can be formed from ceramic material.

It will be appreciated that it is possible to devise alternative arrangements and geometries for the column and the electrodes. For example, the anode can be a perforated cylinder concentric with an outer cylindrical cathode with spaced apart plates within the anode displaced axially relative to annular electrically non-conducting, baffle plates arranged at intervals within the annular chamber formed by the cathode about the anode. Such an arrangement is similar to that of FIG. 1 with the omission of the anode rod 1. Alternatively, the column can comprise concentric cylindrical anode and cathode with electrically non-conducting sieve plates or baffle plates axially spaced along the annular chamber between the electrodes.

Figure 4:
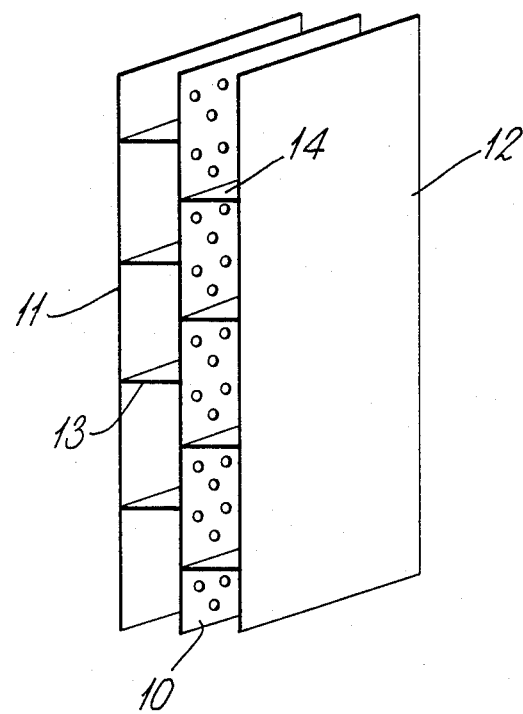
FIG. 4 is a schematic elevation of a further embodiment.

Yet again, the electrodes can be laminae. Thus a column can comprise parallel plate electrodes within a housing and with axially staggered electrically non-conducting, baffle plates within the housing and between the plates. In one arrangement, a perforated plate anode can be arranged centrally between two perforated plate cathodes. The plates can be positioned within a cylindrical housing forming the wall of the pulsed column. Alternatively and as shown in FIG. 4, a central perforated plate anode 10 can be positioned between plate cathodes 11, 12 with the baffles 13 at one side of the anode being axially offset with respect to the baffles 14 at the opposite side so as to provide a convoluted flow path along the column. In a further arrangement, plate electrodes can carry axially staggered baffle plates with the baffle plates on one of the electrodes being interleaved with those on the other electrode so as to provide a convoluted flow path along the region between the electrodes. In a further modification, spaced apart sieve plates can be arranged to extend between plate electrodes. A plurality of cells constituted by plate electrodes can be arranged as a battery.

The above are examples only of alternative arrangements and geometries and it will be appreciated that the polarities of the electrodes are reversible.

In use, a particular example is in the nuclear industry for the separation of plutonium from uranium during reprocessing operations. It is also anticipated that the apparatus can find use in two-phase organic synthesis.

We claim:

1. A pulsed counterflow extraction column for a liquid-liquid extraction of two phases during simultaneous electrolysis comprising an upright pulsed column containing an anode and a cathode forming an assembly and a means for dispersing a first phase of the two phases within a continuous ionically conducting second phase of the two phases, the anode and the cathode being geometrically arranged to produce a substantially uniform current distribution.

2. A pulsed counterflow extraction column according to claim 1 in which the anode and cathode assembly comprises concentric elongate cylindrical members.

3. A pulsed counterflow extraction column according to claim 2 in which the anode is titanium sub-oxide, the cathode is titanium metal and the means for dispersing is a plurality of plates made of a ceramic material.

4. A pulsed counterflow extraction column according to claim 1 including a cylindrical anode and a coaxial perforated cathode forming an annular chamber about the anode, a plurality of spaced apart first set of plates about the anode and dividing the chamber into a plurality of compartments, a plurality of spaced apart second set of plates about the cathode and staggered axially with respect to the first set of plates such that flow is directed by the first and second sets of plates to pass radially inwardly and outwardly through the cathode.

5. A pulsed counterflow extraction column according to claim 1 in which the anode and cathode assembly comprises spaced apart plates.

6. A pulsed counterflow extraction column according to claim 1 including a plurality of anode and cathode assemblies disposed in a common housing.

* * * * *